United States Patent
Hellegouarch et al.

(10) Patent No.: US 11,434,017 B2
(45) Date of Patent: Sep. 6, 2022

(54) OPENING COWL ASSEMBLY AND DEPLOYMENT MECHANISM

(71) Applicant: SAFRAN AIRCRAFT ENGINES, Paris (FR)

(72) Inventors: Antoine Elie Hellegouarch, Moissy-Cramayel (FR); Quentin Matthias Emmanuel Garnaud, Moissy-Cramayel (FR); Marc Patrick Tesniere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 114 days.

(21) Appl. No.: 16/954,955

(22) PCT Filed: Dec. 18, 2018

(86) PCT No.: PCT/FR2018/053368
§ 371 (c)(1),
(2) Date: Jun. 17, 2020

(87) PCT Pub. No.: WO2019/122684
PCT Pub. Date: Jun. 27, 2019

(65) Prior Publication Data
US 2020/0377220 A1    Dec. 3, 2020

(30) Foreign Application Priority Data
Dec. 18, 2017  (FR) ........................................ 1762327

(51) Int. Cl.
*B64D 29/06*    (2006.01)
*B64D 29/08*    (2006.01)
*B64D 27/26*    (2006.01)

(52) U.S. Cl.
CPC ............. *B64D 29/06* (2013.01); *B64D 27/26* (2013.01); *B64D 29/08* (2013.01); *B64D 2027/268* (2013.01)

(58) Field of Classification Search
CPC .......... B64D 29/06; B64D 29/08; F02K 1/60; F02K 1/605; F02K 1/62; F02K 1/625; F02K 1/70; F02K 1/72
See application file for complete search history.

(56) References Cited

U.S. PATENT DOCUMENTS 2,178,998 A    11/1939 William
3,380,662 A *   4/1968 Miller ...................... F02K 1/62
                                                   239/265.37
(Continued)

FOREIGN PATENT DOCUMENTS

FR    2622930 A1    11/1987
FR    2912378 A1    8/2008
(Continued)

OTHER PUBLICATIONS

French Search Report FR1762327, dated May 8, 2018 (2 pages).
International Search Report In PCT/FR2018/053368, dated Mar. 29, 2019 (2 pages).

*Primary Examiner* — Andrew H Nguyen
(74) *Attorney, Agent, or Firm* — Bookoff McAndrews, PLLC.

(57) ABSTRACT

The invention relates to the field of fairings of aircraft propulsion units, and more particularly to an assembly comprising a longitudinal beam (31) configured to be mounted on a lateral of a turbofan (7) engine core (11), oriented parallel to a longitudinal axis (X) of the turbofan (7), an opening fairing (18) cowl (50) of the engine core (11) and a deployment mechanism (60) mounted on the longi- (Continued)

tudinal beam (31) to move the opening cowl (50) between an open position and a closed position.

7 Claims, 8 Drawing Sheets

(56) References Cited

U.S. PATENT DOCUMENTS

| | | | | | |
|---|---|---|---|---|---|
| 4,462,207 | A | * | 7/1984 | Hitchcock | F02K 1/60 239/265.31 |
| 4,920,744 | A | * | 5/1990 | Garcia | B64D 29/08 244/54 |
| 2010/0327110 | A1 | * | 12/2010 | Caruel | B64D 29/08 244/54 |

FOREIGN PATENT DOCUMENTS

| | | |
|---|---|---|
| FR | 2920177 A1 | 2/2009 |
| FR | 2926790 A1 | 7/2009 |
| WO | WO 2014/091162 A1 | 6/2014 |

\* cited by examiner

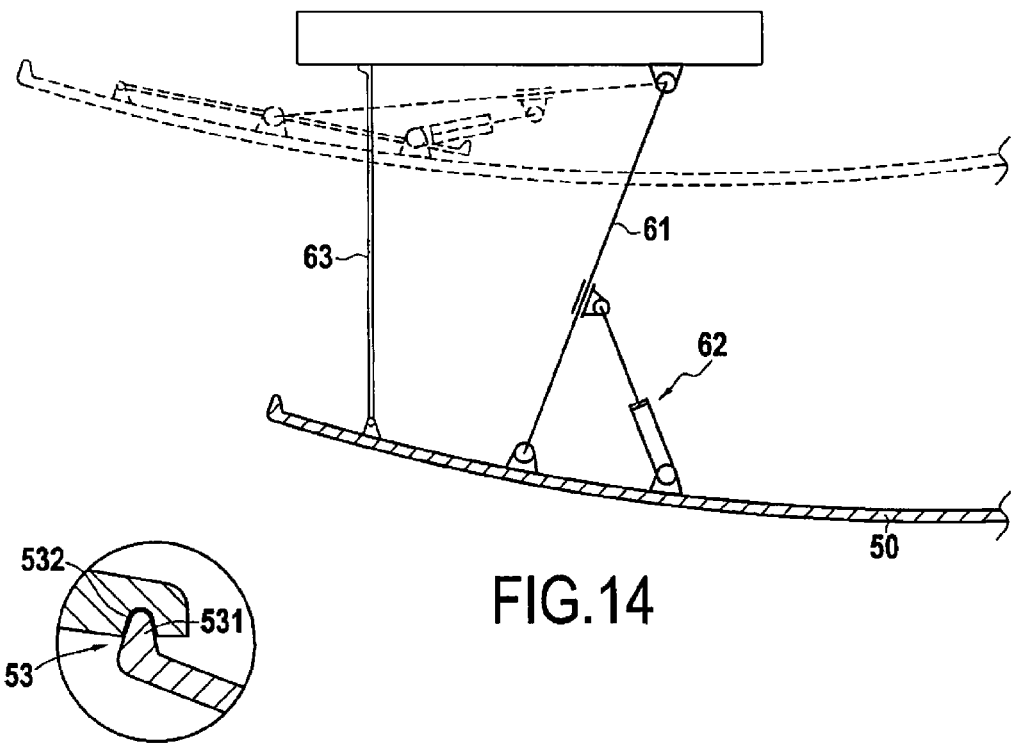
FIG.14
FIG.15
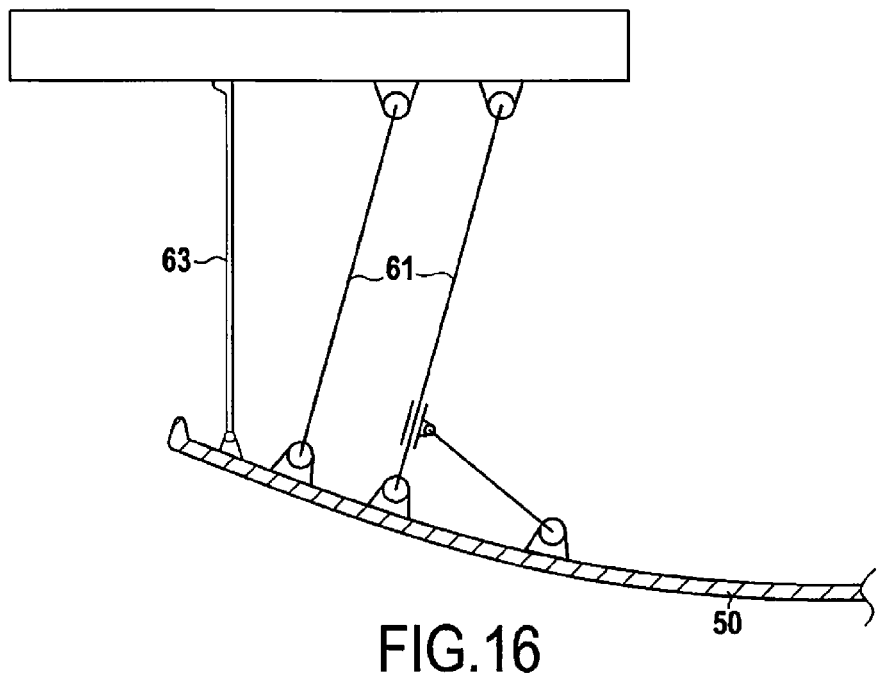
FIG.16

OPENING COWL ASSEMBLY AND DEPLOYMENT MECHANISM

CROSS-REFERENCE TO RELATED APPLICATION(S)

This patent application is the U.S. National Phase Entry Under 35 U.S.C. § 371 of International Application No. PCT/FR2018/053368, filed on Dec. 18, 2018, which claims the benefit of priority to French Patent Application No. 1762327, filed on Dec. 18, 2017.

BACKGROUND OF THE INVENTION

The present invention relates to the field of fairings of aircraft propulsion units, and more particularly to an assembly comprising an opening fairing cowl of the engine core of a turbofan, and a deployment mechanism to move the opening cowl between an open position and a closed position.

In the prior art, deployment mechanisms have been proposed, for example in the publication of the French patent application FR 2 926 790 A1, mounted directly on a casing of the engine core. This, however, subjects this casing to additional mechanical forces that it is preferred to avoid.

For this purpose, in other assemblies, like for example those disclosed in the publication of international patent application WO 2014/0911162A1, and in the publication of the French patent application FR 2 622 930 A1, it has been proposed to connect the deployment mechanism to a pylon supporting the propulsion unit. This, however, poses additional restrictions on the geometry, the bulk and especially the kinematics of the deployment mechanism to avoid mechanical interference with the pylon or with another opening cowl.

OBJECT AND SUMMARY OF THE INVENTION

The present disclosure aims to correct these disadvantages by proposing an assembly comprising an opening cowl for a fairing of the engine core of a turbofan and a deployment mechanism for moving the opening cowl between an open position and a closed position, in which the deployment mechanism can be simplified with risk of mechanical interference with other elements of the nacelle of the turbofan.

According to a first aspect of this disclosure, to reach this goal, this assembly can also comprise a longitudinal beam configured to be mounted laterally on an engine core of a turbofan, oriented parallel to a longitudinal axis of the turbofan, and the deployment mechanism to be mounted on this longitudinal beam.

Thanks to these arrangements, the deployment mechanism can be mounted in a stable manner on one side of the engine core, thus having the benefit of more space than in proximity to a support pylon of the turbofan.

According to a second aspect of this disclosure, the deployment mechanism can comprise a first pivoting arm extending between a first end, connected to the longitudinal beam by a first hinge, and a second end, connected to the opening cowl by a second hinge. The deployment mechanism can also allow the opening of the opening cowl by pivoting the first pivoting arm to offer good access to the engine core in order, for example, to carry out inspection, maintenance and/or repair work there. To then ensure the retention of the opening cowl in the open position and/or in the closed position, the deployment mechanism can further comprise a retaining rod extending between a first end, connected by a first joint to the pivoting arm between the first and second ends of the pivoting arm, and a second end, connected by a second joint to the opening cowl. The retaining rod can thus block the pivoting of the pivoting arm relative to the opening cowl. To allow this sliding, the retaining rod can be telescopic and/or the first joint and/or the second joint of the retaining rod can be sliding. The deployment mechanism can then comprise at least one lock to block the sliding of the sliding joint and/or the telescoping of the retaining rod and thus block the relative pivoting of the pivoting arm relative to the opening cowl.

The deployment mechanism can also comprise a second pivoting arm parallel to the first pivoting arm and also extending between a first end connected to the longitudinal beam by a first hinge and a second end connected to the opening cowl by a second hinge, so as to form a deformable parallelogram with the first pivoting arm, the longitudinal beam and the opening cowl, and thus retain the orientation of the opening cowl relative to the longitudinal beam during the opening and closing of the opening cowl. In addition, with a deformable parallelogram of this type, the retaining rod can not only block the pivoting of the opening cowl relative to the first pivoting arm, but also, through that, the entire opening or closing movement of the opening cowl.

The deployment mechanism can also comprise a cowl prop able to be releasably fixed between the longitudinal beam and the opening cowl in the open position, in order to maintain their separation. In addition, the first hinge can be mounted sliding on the longitudinal beam, to thus combine lateral deviation and longitudinal sliding during the opening and closing of the opening cowl, and thus offer better access to the engine core.

Moreover, according to a second aspect, the opening cowl can be mounted sliding on the longitudinal beam, and in particular sliding parallel to the longitudinal axis of the turbofan.

BRIEF DESCRIPTION OF THE DRAWINGS

The invention will be well understood and its advantages will appear more clearly upon reading the detailed description that follows, of embodiments shown by way of non-limiting examples. The description refers to the appended drawings, in which:

FIG. 14 is a schematic top view of another variant of the deployment mechanism of FIG. 10, with the opening cowl in the open position, FIG. 15 is a detail view of an upstream seal of the open cowl of FIG. 10, in the closed position, FIG. 16 is a schematic top view of yet another variant of the deployment mechanism of FIG. 10, with the opening cowl in the open position.

DETAILED DESCRIPTION OF THE INVENTION

Figure 1:
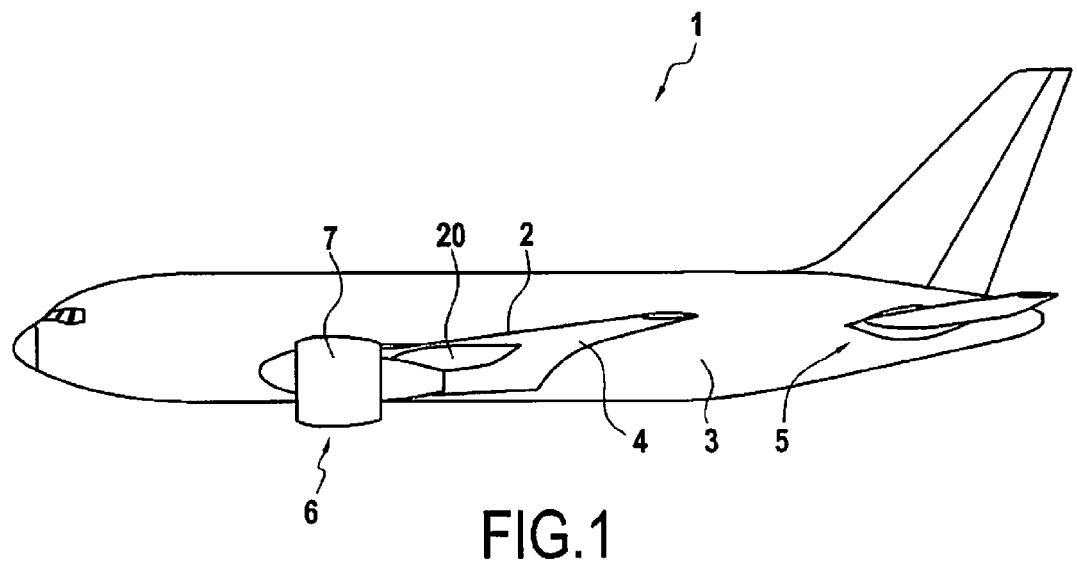
FIG. 1 is a schematic perspective view of an aircraft.

FIG. 1 illustrates an aircraft 1 comprising a fuselage 3, a wing 4 and an empennage 5, and two propulsion units 6, suspended under the wing 4 to corresponding receiving structures 2. Each receiving structure 2 can be secured to one respective wing panel of the two wing panels of the wing 4. Although in FIG. 1, which is a side view of the aircraft 1, a single wing panel of this wing 4 is visible with its receiving structure 2 and its corresponding propulsion unit 4, the aircraft 1 can be substantially symmetrical with respect to a longitudinal and vertical plane, in such a manner that the other wing panel, with the respective receiving structure and propulsion unit 6, is located on the hidden side of the aircraft 1, and is therefore not visible in this figure. In a manner known per se, each receiving structure comprises a pylon fixed to the wing panel, for example by interfaces fixed to at least one spar of the wing panel. However, alternatively or additionally to a pylon of this type, the receiving structure can also consist of a structural casing of the wing panel.

Figure 2:
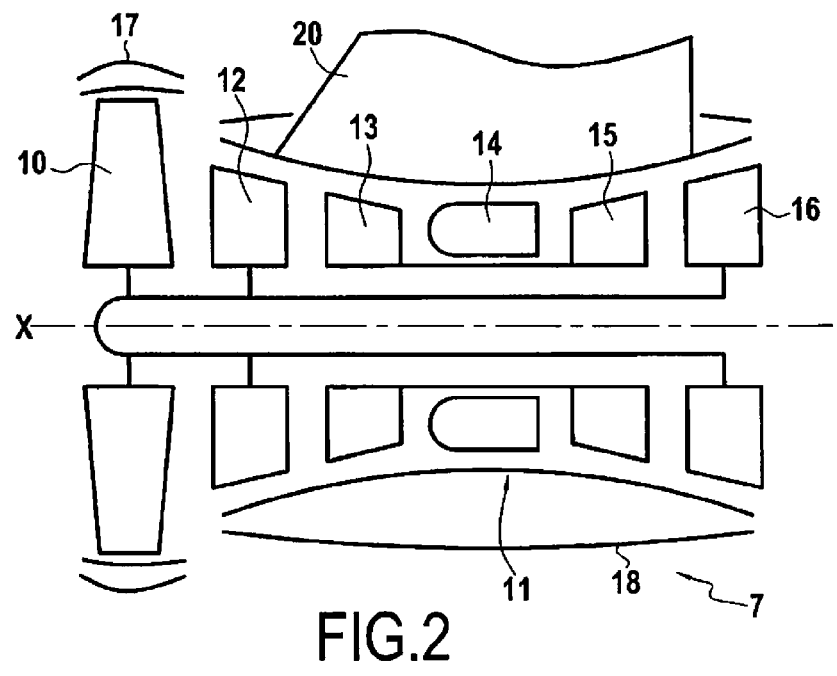
FIG. 2 is a schematic longitudinal section of a turbofan of the aircraft of FIG. 1.

Another identical or similar propulsion unit 6 is also suspended to a second wing panel on the other side of the aircraft, not visible in the figure. Each of these two propulsion units 6 can comprise a turbofan 7. As illustrated schematically in FIG. 2, this turbofan 7 can comprise a fan 10 and an engine core 11 formed by a low-pressure compressor 12, a high-pressure compressor 13, a combustion chamber 14, a high-pressure turbine 15 coupled to the high-pressure compressor for its actuation, and a low-pressure turbine 16 coupled to the fan 10 and to the low-pressure compressor 12 for their actuation, aligned in the longitudinal direction along the longitudinal axis X which can also be the thrust axis of the turbofan 7. In each of these two propulsion units 6, the fan 10 and the engine core 11 receive respective fairings 17, 18.

In the aircraft 1 illustrated, the turbofans 7 can have a high bypass ratio, greater for example than 5:1, 10:1, even 15:1. The diameter of the fan 10 is therefore particularly large, in such a manner that, to retain sufficient ground clearance, because the aircraft 1 illustrated has a low wing, the fan 10 is offset upward and forward relative to a conventional arrangement. To arrive at this offset, the fan 10 is not suspended to the receiving structure 2 secured to the wing 4, but is retained only by its structural connections to the engine core 11. Thus, as illustrated in FIG. 1, the structural assembly 20 connecting each turbofan 7 to the wing is not attached directly to the fan 10, but only to the engine core 11, with the fan 10 thus suspended cantilevered relative to this assembly 20.

Figure 3:
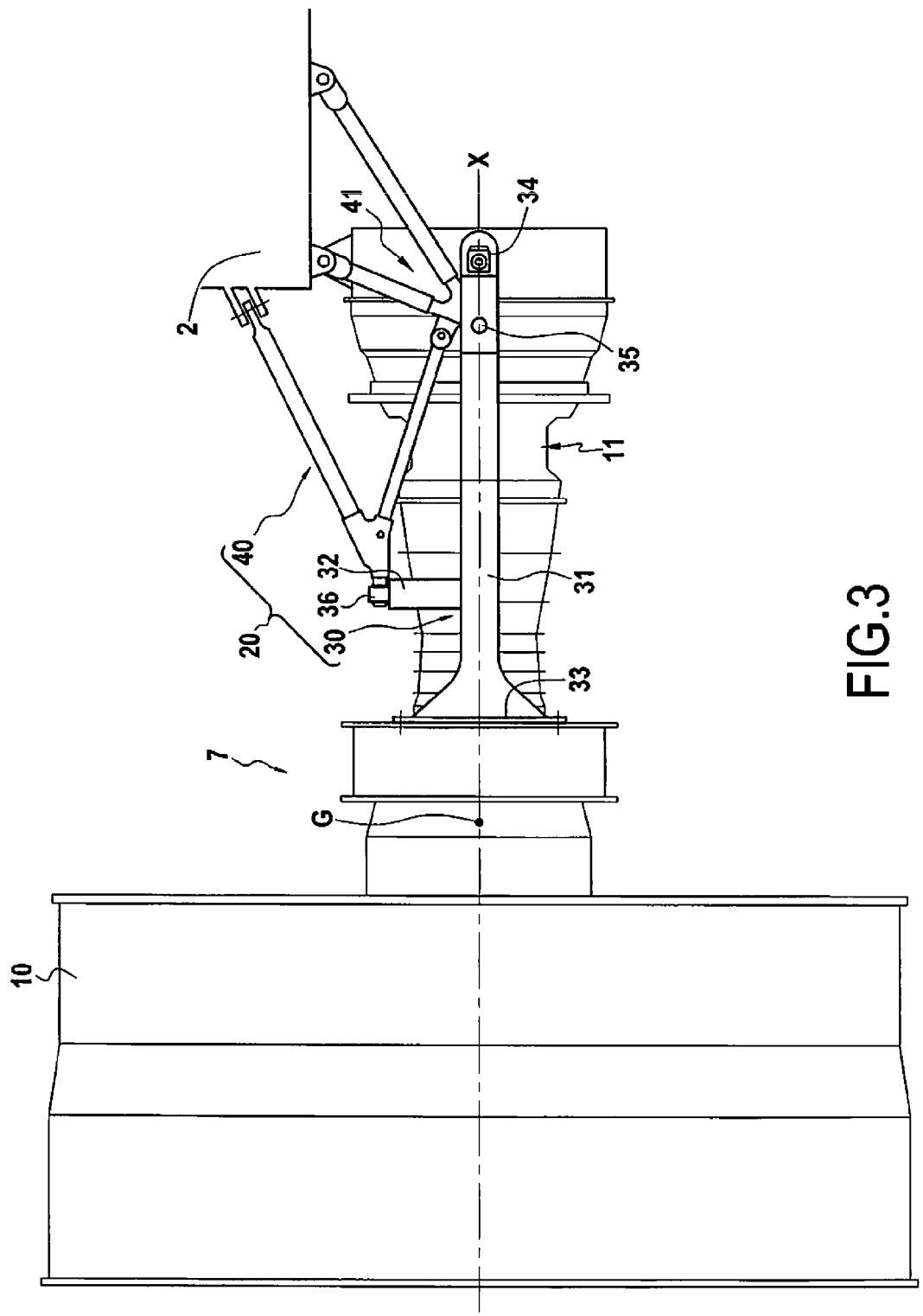
FIG. 3 is a side view of a structural assembly connecting the turbofan of FIG. 2 to a receiving structure of the aircraft of FIG. 1.
Figure 4:
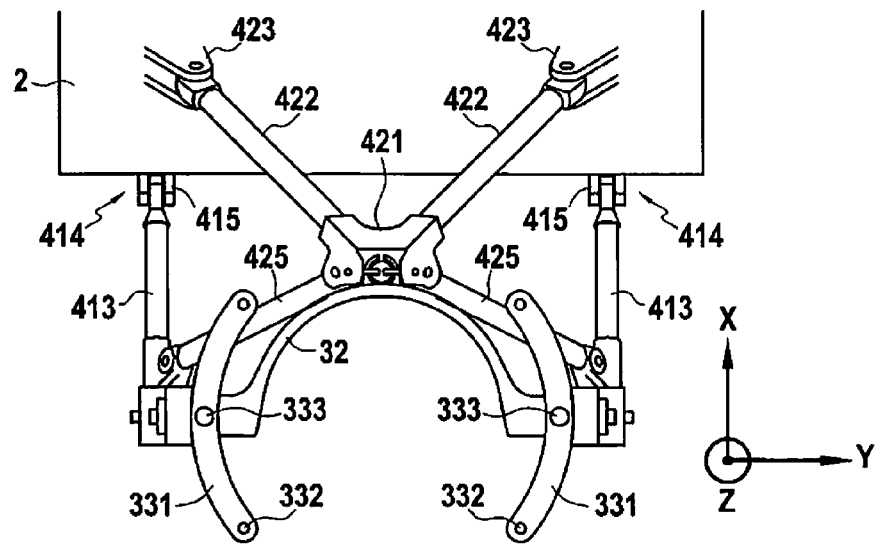
FIG. 4 is a front view of the structural assembly of FIG. 3.
Figure 5:
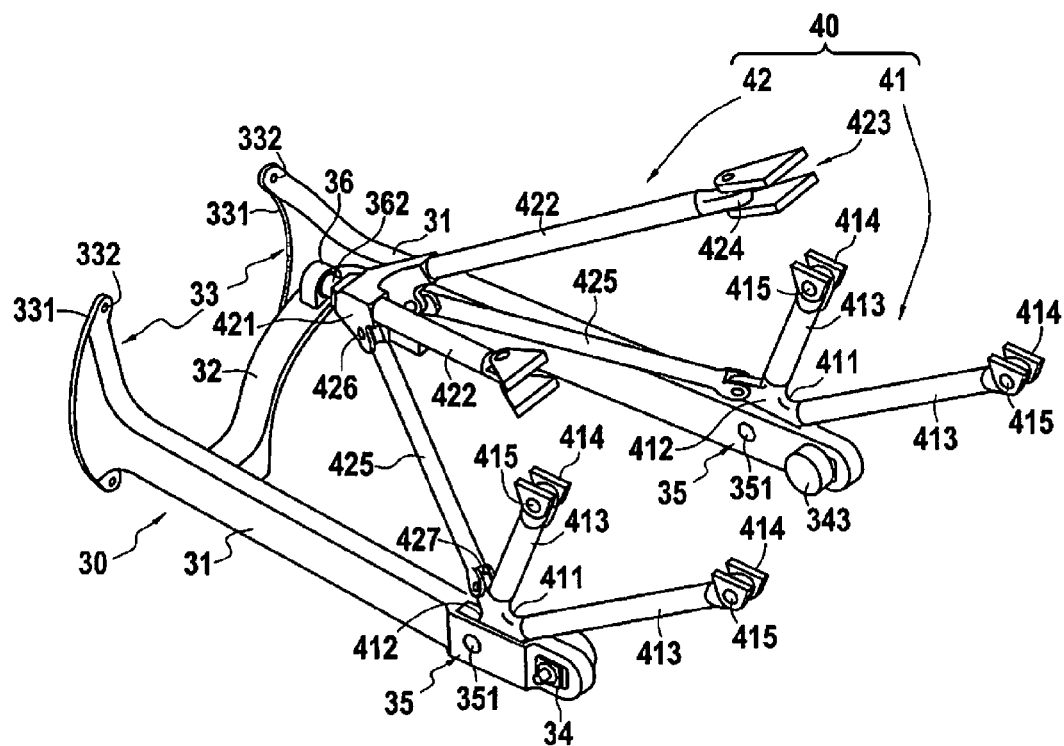
FIG. 5 is a three-quarter rear perspective view of the structural assembly of FIG. 3.

One exemplary embodiment of the assembly 20 is illustrated in FIGS. 3 to 5. Thus, as can be seen in these figures, this structural assembly 20 can comprise a bearing structure 30 configured to be applied to the engine core 11 and a suspension structure 40 to connect the bearing structure 30 to the receiving structure of the aircraft 1. More specifically, the bearing structure 30, which can in particular be formed in a single one-piece part, can comprise two longitudinal beams 31 and a transverse connection 32 connecting them rigidly. In the embodiment illustrated, this transverse connection 32 has the shape of an arch, but other shapes can be considered for this transverse connection 32, such as for example a 360° closed ring, integral with the two longitudinal beams or applied to them, which could further reinforce the rigidity of the bearing structure 30 in the transverse plane. As in the embodiment illustrated, each of the two longitudinal beams 31 can include at least one forward mounting interface 33 and one rear mounting interface 34 for mounting the structure to the engine core 11, and a lateral suspension point 35 for connection with the suspension structure 40. These lateral suspension points 35 on the longitudinal beams 31 can be complemented, as illustrated, with a central suspension point 36 for connection with the suspension structure 40, located on the transverse connection 32.

Figure 6:
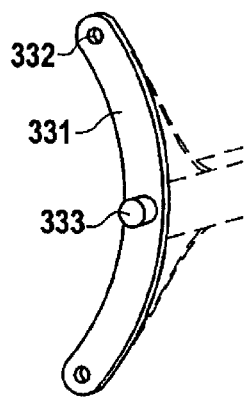
FIG. 6 is a detail view of a front mounting interface of the structural assembly of FIG. 3.

As illustrated, each forward mounting interface 33 can be configured to be fixed to a casing near the front end of the engine core 11, for example an inter compressor casing flange located between the low-pressure compressor 12 and the high-pressure compressor 13, and transmit forces both in the longitudinal direction and in the transverse plane perpendicular to the longitudinal axis X. To this end, as illustrated in detail in FIG. 6, each forward mounting interface 33 can comprise a plate 331 with through openings 332 to receive bolts in order to transmit longitudinal tension forces, and at least one lug 333 for transmitting transverse shear forces. These transverse forces can be both lateral, i.e. parallel to the lateral axis Y, and vertical, i.e. parallel to the vertical axis Z.

Figure 7:
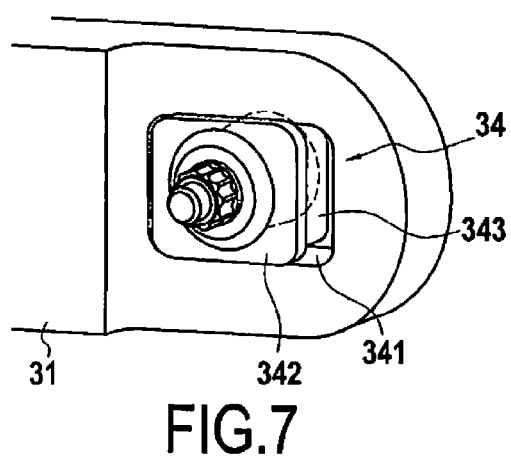
FIG. 7 is a detail view of a rear mounting interface of the assembly of FIG. 3.

On the other hand, each rear mounting interface 34 can be configured to be connected to a casing near the rear end of the engine core 11, for example a turbine casing, allowing a relative longitudinal and transverse deviation of the engine core 11 relative to this rear mounting interface 34, so as to accommodate the thermal dilation of the engine core 11 during operation. Thus, as illustrated in FIG. 7, each rear mounting interface 34 can comprise a slide 341 for receiving a slider 342 mounted on a stud 343 secured to the engine core 11, for example a turbine casing of the engine core 11, while allowing deviation of the slider 342 in the longitudinal direction as well as the lateral direction. In this manner, the rear mounting interface 34 will normally transmit only vertical forces to compensate the longitudinal offset between the center of gravity G of the turbofan 7 and the forward mounting interfaces 33.

Thus, when the bearing structure 30 is mounted on the engine core 11, the latter can be fixed between the two longitudinal beams 31, oriented parallel to the longitudinal axis X of the turbofan 7, so that they assume the vertical bending moments, and particularly those generated by the cantilevering of the fan 10, thus relieving the casings of the engine core 11 of such forces.

Figure 8:
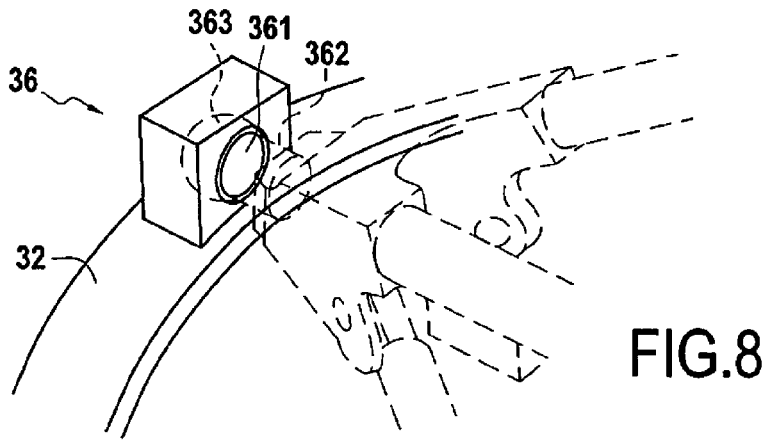
FIG. 8 is a detail view of a central suspension point of a variant of the structural assembly of FIG. 3.

The lateral suspension points 35 can be located on the rear ends of the longitudinal beams 31, in proximity to the rear mounting interface 34, and be configured to transmit longitudinal and vertical forces. To this end, each lateral suspension point 35 can for example comprise an axis 351, intended to be received, oriented in the lateral direction, into a corresponding opening in the suspension structure 40. The central suspension point 36 can be located, as illustrated, in the center of the transverse connection 32, straddling the engine core 11 when the structure is mounted on it. The central suspension point can then directly overhang the longitudinal axis X of the turbofan 7, and be configured to transmit vertical and lateral force in the transverse plane. To this end, the central suspension point 36 can comprise, as illustrated, an opening 361 configured to receive a hanger oriented in the longitudinal direction. In a variant illustrated in detail in FIG. 8, the central suspension point 36 can also comprise a ball joint 363 including a ball nut in which is formed the opening 361, in order to allow angular deviation of the hanger 362 in the central suspension point 36, and thus avoid the transmission of moments through the central suspension point 36.

As illustrated in FIGS. 3 to 5, the suspension structure 40 can comprise two suspension triangles 41, each configured to be connected by a lower point 411 (FIG. 5) to one of the lateral suspension points 35 of the structure 30. When the lateral suspension points 35 comprise, as in the example illustrated, axes 351, the clevises 412 intended to receive them can be formed in these lower points 411 of the suspension triangles 41. Each suspension triangle 41 can be oriented so as to transmit to the receiving structure 2 the vertical and longitudinal forces that it receives through the corresponding lateral suspension point 35. In order to limit their mass, each suspension triangle 41 can be formed, as illustrated, by two rods 413 connected by the lower point 411, although it is also practicable to use a triangular plate 41' for each suspension triangle, as in the variant illustrated in FIG. 9. Each rod 413 of each suspension triangle 41 can be configured, as illustrated, to be connected, by its end opposite the lower point 411, to an attachment point 414 on the receiving structure 2, through a joint 415 allowing at least and angular deviation in the plane of the suspension triangle 41, in order to avoid the transmission of bending moments between the receiving structure 2 and each rod 413. These joints 415 can also comprise ball joints to allow angular deviations in other planes.

Moreover, the suspension 40 can also comprise, as illustrated, a suspension pyramid 42 configured to connect the central suspension point 36 of the structure 30 to the receiving structure 2. For this purpose, this suspension pyramid 42 can comprise a vertex 421, in which is formed the hanger 362, and four rods joining at the vertex 421. More specifically, among these four rods two upper rods 422 can be rigidly fixed to the vertex 421, extend toward the corresponding attachment points 423 on the receiving structure 2, and be configured to be connected to these attachment points 423 through joints 424 to prevent the transmission of bending moments, in this inclined plane, between each of the attachment points 423 and the corresponding upper rod 422. Two lower rods 425, each connected by joints 426, 427 corresponding to the vertex 421 of the suspension pyramid 42 and to the lower point 411 of a respective suspension triangle 41, can complete the suspension pyramid 42 so as to maintain the separation between the vertex 421 of the pyramid 42 and the lower points 411 of the suspension triangles 41. The geometry of the suspension structure 40 can thus be maintained even when the bearing structure 30 is detached from it.

Figure 9:
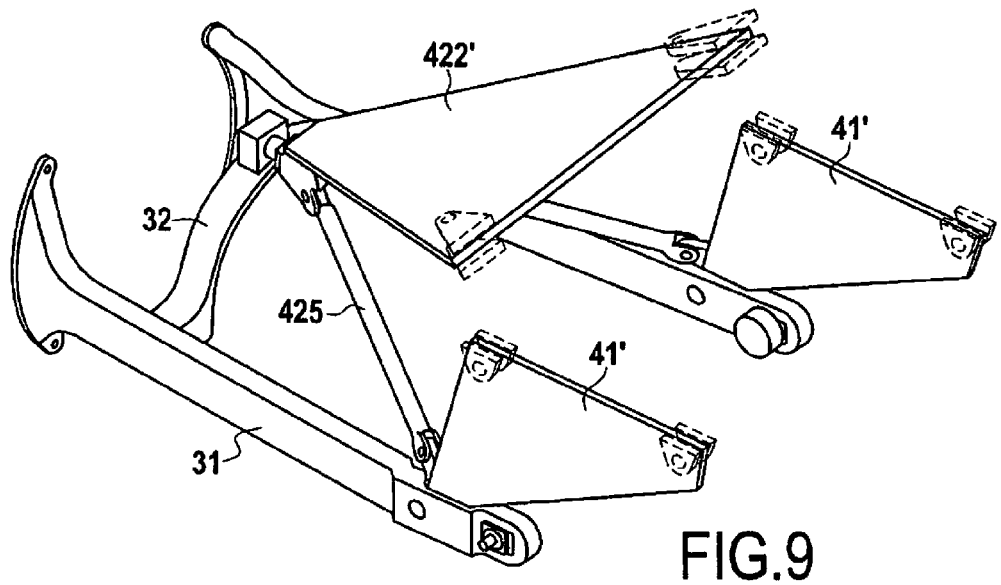
FIG. 9 is a three-quarter rear perspective view of a variant of the assembly of FIG. 3.

Like each of the suspension triangles 41, the two upper rods 422 could also be replaced by a triangular plate 422', oriented in the inclined plane and similarly connected to the vertex 421 of the suspension pyramid 42 and to the attachment points 423 on the receiving structure 2, as in the variant illustrated in FIG. 9, in which equivalent elements to those of FIG. 5 receive the same reference numbers. The aerodynamic impact of a plate 422' of this type on the flow of air in the secondary stream can be controlled, for example by aperturing the plate 422', which also allows reducing its mass. Even if, on the variant illustrated, the triangular plates 41' and 422' each replace suspension triangles 41 as well as the upper rods 422, it is also practicable to replace only the upper rods 422 or one and/or the other of the two suspension triangles 41 in a mixed suspension structure combining rods and one or two triangular plates. Moreover, the plate 422', or one or the other of the plates 41', can be used as a support for a surface heat exchanger, for example an air/air or air/oil exchanger.

Figure 11:
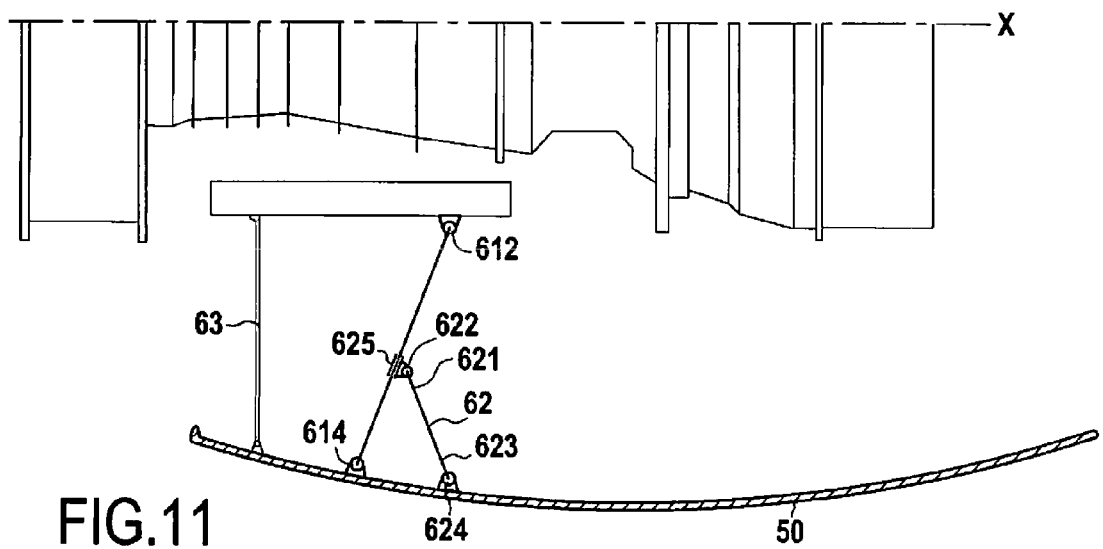
FIG. 11 is a schematic top view of the deployment mechanism of FIG. 10, with the opening cowl in the open position.
Figure 12:
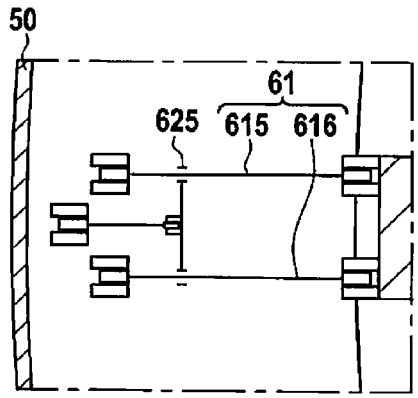
FIG. 12 is a schematic rear view of the deployment mechanism of FIG. 10, with the opening cowl in the open position.
Figure 13:
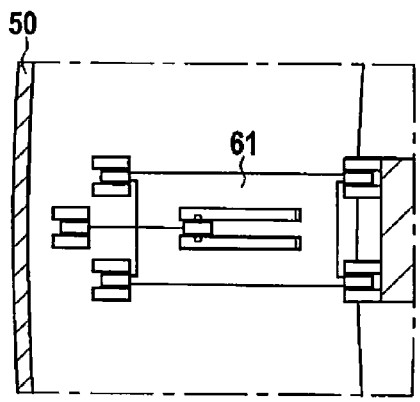
FIG. 13 is a schematic rear view of a variant of the deployment mechanism of FIG. 10, with the opening cowl in the open position.

In order to allow inspection, maintenance or repair work on the engine core 11, its fairing 18 can comprise opening cowls 50. Each opening cowl can be located laterally relative to the engine core 11 and be connected to the corresponding longitudinal beam 31 of the structure 30 by a deployment mechanism 60. According to a first embodiment, illustrated in FIGS. 10 to 12, this deployment mechanism can comprise a pivoting arm 61, extending between a first end 611 connected to the longitudinal beam 31 by a first hinge 612 the pivot axis of which can in particular be vertical, and a second end 613 connected to the opening cowl 50 by a second hinge 614, the pivot axis of which can in particular be parallel to that of the first hinge 612. When the pivot axes of the first and second hinges 612, 614 are parallel, this pivoting arm 61 can be formed, as illustrated, by two parallel rods 615, 616, offset from one another along these pivot axes, as illustrated in FIG. 12. However, it is also practicable that the pivoting arm 61 be formed in a single piece, with a certain width along the pivot axes, as in the variant illustrated in FIG. 13.

Figure 10:
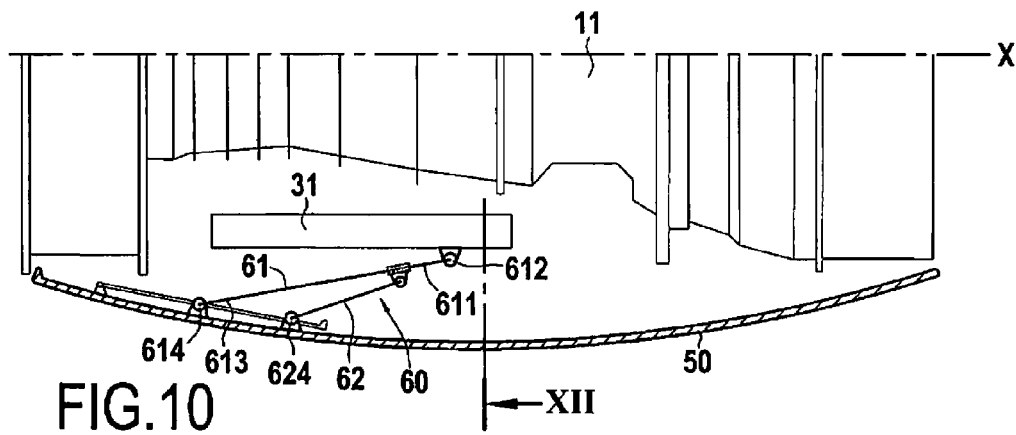
FIG. 10 is a schematic top view of a deployment mechanism interleaved between an open cowl of the engine core of the turbofan of FIG. 2 and a longitudinal beam of the assembly of FIG. 3, according to a first embodiment, with the opening cowl in the closed position.

In order to ensure the retention of the opening cowl 50 in the open position and/or in the closed position, the deployment mechanism 60 can further include a retaining rod 62 extending between a first end 621, connected by a first joint 622 to the pivoting arm 61 between its two ends 611, 613, and a second end 623, connected by a second joint 624 to the opening cowl 50. To allow the movement of the opening cowl 50 between its open and closed positions, the first joint 622 and/or the second joint 624 of the retaining rod 62 can be mounted on runners 625, as illustrated in FIGS. 10 to 12, and/or the retaining rod 62 can be telescopic, as in the variant illustrated in FIG. 14. The deployment mechanism 60 can then also comprise a lock (not illustrated) to lock the retaining rod 62 when the opening cowl 50 is in the open position and/or in the closed position.

Moreover, the deployment mechanism 60 can also comprise, additionally or alternatively to the retaining rod 62, a cowl prop 63 able to be releasably fixed between the longitudinal beam 31 and the opening cowl 50 in the open position to maintain this open position, and/or at least one lock (not illustrated) to lock the opening cowl 50 in the closed position by retaining it for example by its upper and/or lower edge, as illustrated in FIGS. 12 and 14.

To ensure the sealing of the opening cowl 50 in the closed position, and contain fire, it can be provided with at least one seal 53 on its outer perimeter, and particularly on its upstream edge. As illustrated in FIG. 15, this seal 53 can comprise a rib 531 protruding radially inward on the edge of the opening cowl 50, and a groove 532 secured to the engine core 11 and open radially outward to receive the rib 531 when the opening cowl 50 arrives in the closed position. This arrangement can however also be reversed, so as to locate the rib on the engine core 11 and the groove on the opening cowl 50. As illustrated, the groove 532 can in particular have a V shaped cross section.

In a variant illustrated in FIG. 16, the deployment mechanism 60 can comprise at least two parallel pivoting arms 61 offset with respect to each other in the longitudinal direction, connected similarly to the longitudinal beam 31 and to the opening cowl 50, to thus form with them a deformable parallelogram allowing retaining the orientation of the opening cowl 50 during its opening and closing.

During the opening of the opening cowl 50 from the closed position illustrated in FIG. 10 with the deployment mechanism 60 according to this first embodiment, it is possible to first proceed with pivoting at least one pivoting arm 61, after unlocking the lock 64 and/or the retaining rod 62, to laterally separate the opening cowl 50 from the engine core 11 while moving it downstream, and thus attain the open position illustrated in FIG. 11, in order to thus make accessible the engine core 11, for example for inspection, maintenance and/or repair work. It is possible to finally proceed with locking the deployment mechanism 60 in this open position with the lock of the retaining rod 62 and/or fix the cowl prop 63 between the longitudinal beam 31 and the opening cowl 50 in order to avoid untimely closing. These steps can subsequently be reversed to reclose the opening cowl 50, by returning from the open position illustrated in FIG. 11 to the closed position illustrated in FIG. 10.

Figure 17:
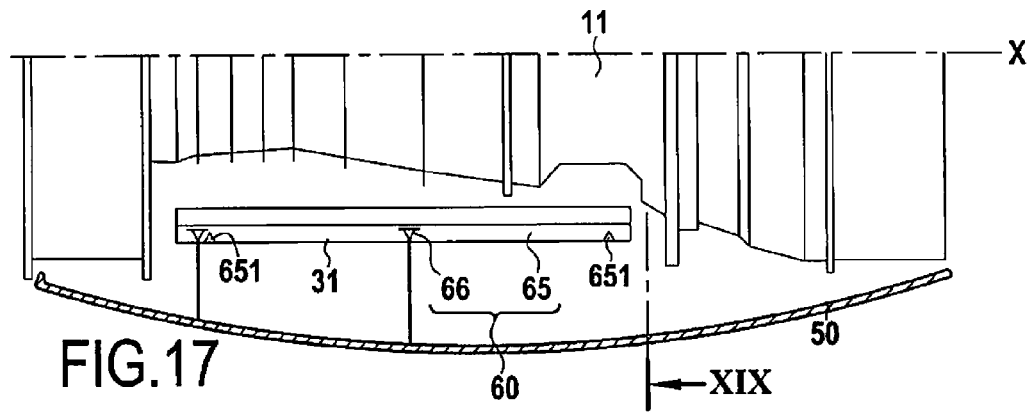
FIG. 17 is a schematic top view of a deployment mechanism according to a second embodiment, with the opening cowl in the closed position.
Figure 18:
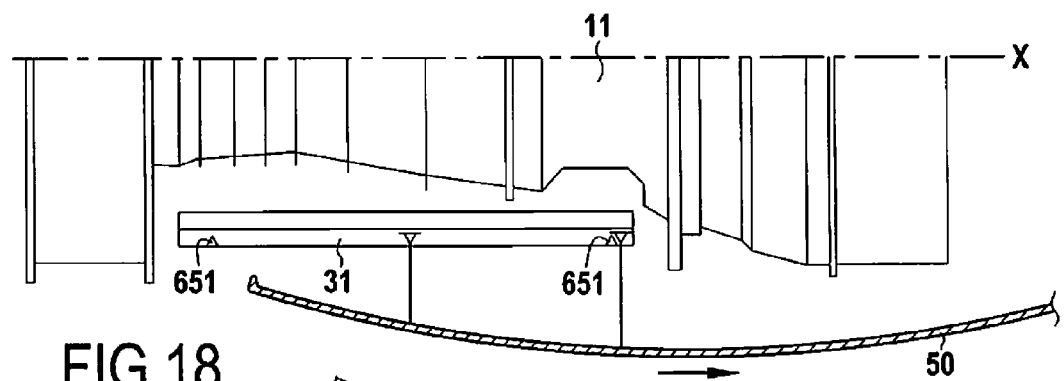
FIG. 18 is a schematic top view of the deployment mechanism of FIG. 17, with the opening cowl in the open position.
Figure 19:
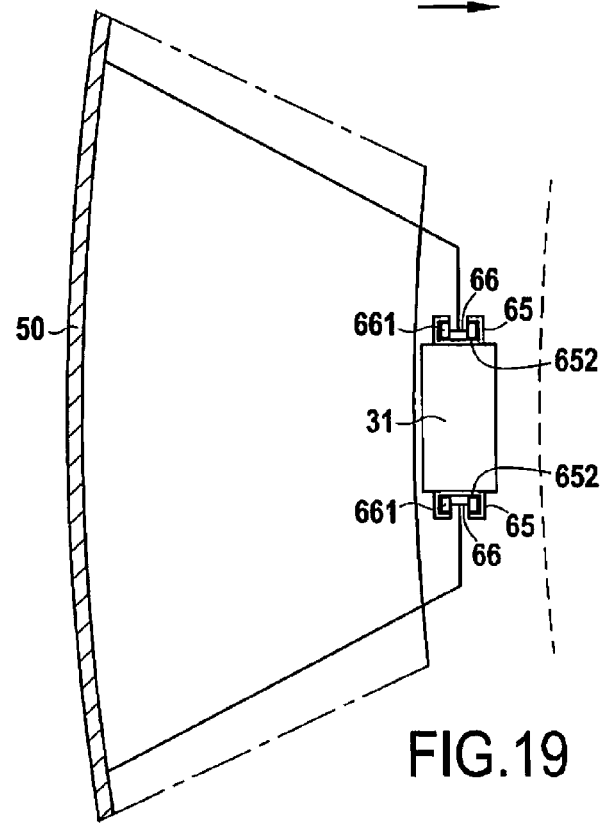
FIG. 19 is a schematic transverse section of the deployment mechanism of FIG. 17.

According to a second embodiment, illustrated in FIGS. 17 to 19, the deployment mechanism 60 can comprise, instead of one or more pivoting arms, one or more slides 65 secured to the longitudinal beam 31 and one or more sliders 66 secured to the opening cowl 50 to allow opening and closing of the opening cowl 50 by sliding the at least one slider 66 in at least one slide 65. In particular, as illustrated in FIGS. 17 and 18, the slide 65 can be oriented along the longitudinal direction, to thus allow longitudinal sliding of the opening cowl 50 between its open position and its closed position. As illustrated in FIG. 19, the deployment mechanism 60 can in particular comprise a first slide 65 located on an upper face of the longitudinal beam 31 and a second slide 65 located on a lower face of the longitudinal beam 31, each receiving at least two sliders 66 connected to the opening cowl 50 and mutually offset in the longitudinal direction.

In order to permit the retention of the opening cowl 50 in the open and/or closed position, the slide 65 can include at least one end-of-travel lock 651. Moreover, to facilitate their sliding, the sliders 66 can be equipped with rollers 661 able to roll on rolling surface 652 in the slide 65, as illustrated in FIG. 19. The other illustrated elements being equivalent to those of the first embodiment, they receive the same reference numbers in FIGS. 17 to 19 as in the preceding figures.

During the opening of the opening cowl 50 from the closed position illustrated in FIG. 17 with the deployment mechanism 60 according to this second embodiment, and after having unlocked at least one slider 66, it is possible to proceed with sliding the opening cowl 50 longitudinally in the downstream direction toward the open position illustrated in FIG. 18, in order to thus make accessible the engine core 11, for example for inspection, maintenance and/or repair work. It is possible to finally proceed with locking the deployment mechanism 60 in this open position, in order to avoid untimely closing. These steps can subsequently be reversed to reclose the opening cowl 50, by returning from the open position illustrated in FIG. 18 to the closed position illustrated in FIG. 17.

Figure 20:
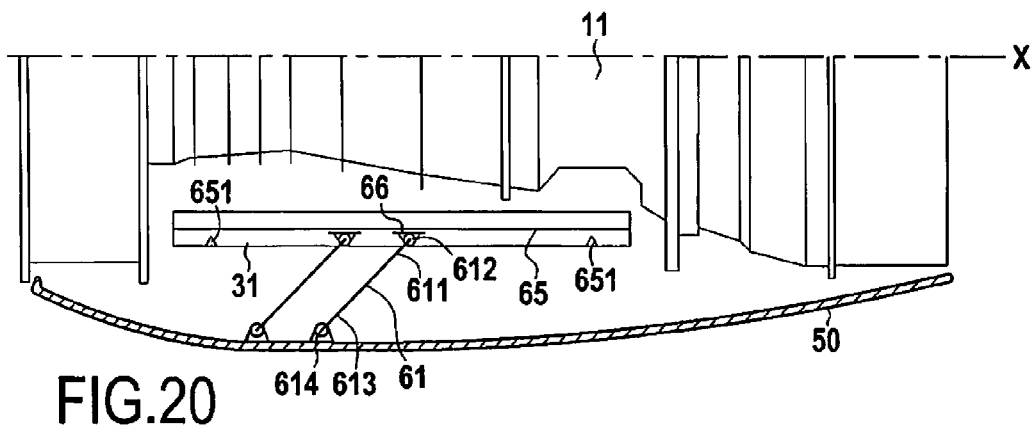
FIG. 20 is a schematic top view of a deployment mechanism according to a third embodiment, with the opening cowl in the closed position.
Figure 21:
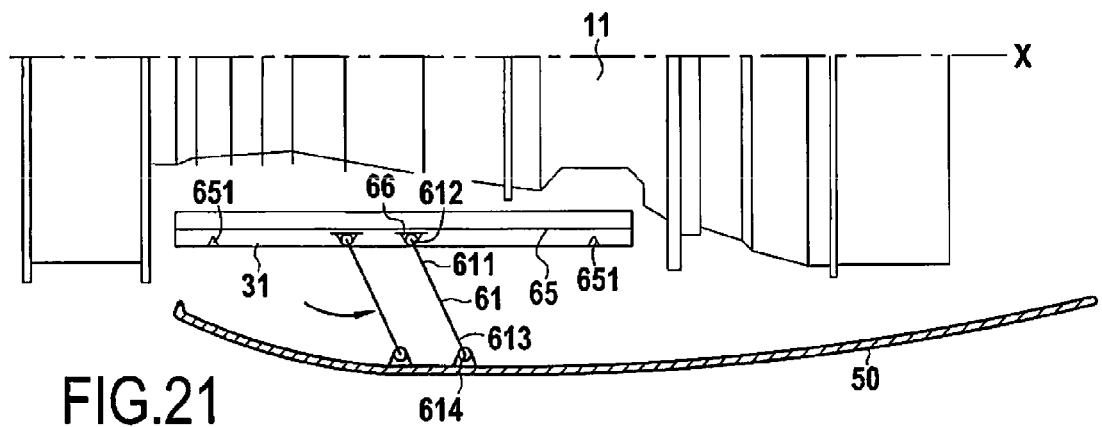
FIG. 21 is a schematic top view of the deployment mechanism of FIG. 20, with the opening cowl in an intermediate position between the open and closed positions.
Figure 22:
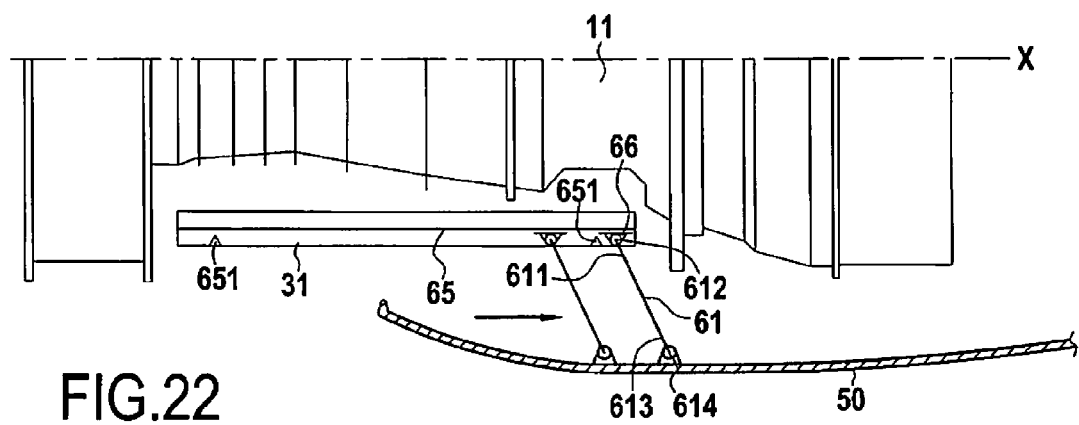
FIG. 22 is a schematic top view of the deployment mechanism of FIG. 20, with the opening cowl in the open position.

In order to offer still better access to the engine core, it is also possible to combine the pivoting arm and sliding as in a deployment mechanism 60 according to a third embodiment illustrated in FIGS. 20 to 22. As illustrated each slider 66 can then be connected to the opening cowl 50 by a pivoting arm 61 extending between a first end 611 connected to the slider 66 by a first hinge 612 the pivot axis of which can in particular be vertical, and a second end 613 connected to the opening cowl 50 by a second hinge 614, the pivot axis of which can in particular be parallel to that of the first hinge 612. To allow the retention of the opening cowl 50 in the open and/or closed position, the slide 65 can include at least one end-of-travel lock 651, as in the second embodiment mentioned above, and at least one of the hinges 612, 614 include a lock (not illustrated) to releasably lock the angular deviation of the at least one pivoting arm 61. The other elements illustrated being equivalent to those of the first two embodiments, they receive the same reference numbers in FIGS. 17 to 19 as in the preceding figures.

During the opening of the opening cowl 50 from the closed position illustrated in FIG. 20 with the deployment mechanism 60 according to this third embodiment, it is possible to first proceed to pivot at least one pivoting arm 61 after unlocking it, to laterally separate the opening cowl 50 from the engine core 11, to thus attain the intermediate position illustrated in figure. From this intermediate position and after having unlocked at least one slider 66, it is possible to proceed with sliding the opening cowl 50 longitudinally in the downstream direction toward the open position illustrated in figure in order to thus make accessible the engine core 11, for example for inspection, maintenance and/or repair work. It is possible to finally proceed with locking the deployment mechanism 60 in this open position, in order to avoid untimely closing. These steps can subsequently be reversed to re-close the opening cowl 50, by returning from the open position illustrated in FIG. 22 to the closed position illustrated in FIG. 20 while again passing through the intermediate position illustrated in figure.

Although the present invention has been described by referring to specific examples and embodiments, as well as to particular variants, it is clear that different modifications and changes can be applied to these examples and their variants without departing from the general scope of the invention as defined by the claims. For example, although only a single opening cowl with a deployment mechanism on a lateral of the engine core has been described for each embodiment, it is naturally practicable to have an opening cowl of this type, and a corresponding deployment mechanism, on each side of the engine core. In addition, individual features of the different examples and embodiments mentioned and of their different variants can be combined into additional embodiments. Consequently, the description and the drawings should be considered illustrative rather than restrictive.

The invention claimed is:

1. An assembly comprising:
a longitudinal beam configured to be mounted laterally on an engine core of a turbofan, oriented parallel to a longitudinal axis (X) of the turbofan,
an opening cowl for a fairing of the engine core, and
a deployment mechanism mounted on the longitudinal beam for moving the opening cowl between an open position and a closed position, wherein the deployment mechanism comprises a first pivoting arm extending between a first end connected to the longitudinal beam by a first hinge and a second end connected to the opening cowl by a second hinge, a second pivoting arm parallel to the first pivoting arm and extending between a first end connected to the longitudinal beam by a third hinge and a second end connected to the opening cowl by a fourth hinge, so as to form a deformable parallelogram with the first pivoting arm, the longitudinal beam and the opening cowl, and a retaining rod extending between a first end, connected by a first joint to the pivoting arm between the first and second ends of the pivoting arm, and a second end, connected by a second joint to the opening cowl.

2. The assembly according to claim 1, further comprising a cowl prop able to be releasably fixed between the longitudinal beam and the opening cowl in the open position.

3. The assembly according to claim 1, wherein the first hinge is mounted sliding on the longitudinal beam.

4. An assembly comprising:
a longitudinal beam configured to be mounted laterally on an engine core of a turbofan, oriented parallel to a longitudinal axis (X) of the turbofan,
an opening cowl for a fairing of the engine core, and
a deployment mechanism mounted on the longitudinal beam for moving the opening cowl between an open position and a closed position, wherein the deployment mechanism comprises a first pivoting arm extending between a first end connected to the longitudinal beam by a first hinge and a second end connected to the opening cowl by a second hinge, and a retaining rod extending between a first end, connected by a first joint to the pivoting arm between the first and second ends of the pivoting arm, and a second end, connected by a second joint to the opening cowl, wherein at least one of the first joint and the second joint of the retaining rod is sliding and/or the retaining rod is telescopic.

5. The assembly according to claim 4, further comprising a second pivoting arm parallel to the first pivoting arm and also extending between a first end connected to the longitudinal beam by a third hinge and a second end connected to the opening cowl by a fourth hinge, so as to form a deformable parallelogram with the first pivoting arm, the longitudinal beam and the opening cowl.

6. The assembly according to claim 4, further comprising a cowl prop able to be releasably fixed between the longitudinal beam and the opening cowl in the open position.

7. The assembly according to claim 4, wherein the first hinge is mounted sliding on the longitudinal beam.

* * * * *